(12) United States Patent
Tazaki et al.

(10) Patent No.: US 7,531,223 B2
(45) Date of Patent: May 12, 2009

(54) OPTICAL ELEMENT AND METHOD FOR MANUFACTURING THE SAME

(75) Inventors: Keiko Tazaki, Tokyo (JP); Runa Nakamura, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 289 days.

(21) Appl. No.: 11/315,972

(22) Filed: Dec. 22, 2005

(65) Prior Publication Data
US 2006/0141172 A1    Jun. 29, 2006

(30) Foreign Application Priority Data
Dec. 28, 2004  (JP) ............... 2004-381066
Aug. 22, 2005  (JP) ............... 2005-239863

(51) Int. Cl.
*C09K 19/56* (2006.01)

(52) U.S. Cl. .................. 428/1.2; 428/1.1; 349/123

(58) Field of Classification Search .............. 428/1.2, 428/1.1; 349/123–124, 127, 135
See application file for complete search history.

(56) References Cited

U.S. PATENT DOCUMENTS

| 5,560,864 | A |   | 10/1996 | Goulding |           |
|-----------|---|---|---------|----------|-----------|
| 5,798,147 | A |   | 8/1998  | Beck et al. |       |
| 5,808,716 | A | * | 9/1998  | Gass et al. | ........ 349/124 |
| 5,847,054 | A |   | 12/1998 | McKee et al. |      |
| 5,965,761 | A | * | 10/1999 | Buchecker et al. | .... 556/440 |
| 5,998,101 | A | * | 12/1999 | Park et al. | ........ 430/321 |
| 6,201,087 | B1|   | 3/2001  | Herr et al. |        |
| 6,277,502 | B1|   | 8/2001  | Buchecker et al. |  |
| 6,335,462 | B1| * | 1/2002  | Etzbach et al. | ..... 560/54 |
| 6,833,421 | B1|   | 12/2004 | Marck |             |
| 7,060,200 | B1| * | 6/2006  | Farrand et al. | ... 252/299.01 |
| 2004/0100600 | A1 | * | 5/2004 | Takeuchi et al. | ..... 349/117 |
| 2004/0265742 | A1 |  | 12/2004 | Marck et al. |    |
| 2005/0074564 | A1 |  | 4/2005  | Yamaoka et al. | |
| 2005/0089650 | A1 | * | 4/2005 | Tanaka et al. | ...... 428/1.1 |

FOREIGN PATENT DOCUMENTS

| CA | 2439201    | * | 8/2003 |
|----|------------|---|--------|
| JP | 5215921    |   | 8/1993 |
| JP | 7-258638 A |   | 10/1995 |
| JP | 08-302320 A|   | 11/1996 |
| JP | 8338913    |   | 12/1996 |
| JP | 9-118727 A |   | 5/1997 |
| JP | 09-152509  | * | 6/1997 |
| JP | 9152509    |   | 6/1997 |
| JP | 10010320   |   | 1/1998 |
| JP | 10-506420 A|   | 6/1998 |

(Continued)

OTHER PUBLICATIONS

Trimethylol Propane Triacrylate, Industrial Chem, May 20, 2008.*

*Primary Examiner*—Keith D Hendricks
*Assistant Examiner*—Sophie Hon
(74) *Attorney, Agent, or Firm*—Ladas & Parry LLP (57) ABSTRACT

The present invention provides an optical element capable of improving the adhesive property between a refractive index anisotropic layer and an alignment property providing layer for providing alignment property to the refractive index anisotropic layer and further improving the endurance of each of the layers.

6 Claims, 3 Drawing Sheets

FOREIGN PATENT DOCUMENTS

| | | |
|---|---|---|
| JP | 10-508882 A | 9/1998 |
| JP | 10-324690 A | 12/1998 |
| JP | 2000-514202 A | 10/2000 |
| JP | 2002-533742 A | 10/2002 |
| JP | 2003-505561 A | 2/2003 |
| JP | 2003-287623 A | 10/2003 |
| JP | 2004-206102 * | 7/2004 |
| JP | 2004-536185 A | 12/2004 |

* cited by examiner

OPTICAL ELEMENT AND METHOD FOR MANUFACTURING THE SAME

BACKGROUND OF THE INVENTION

1. Field of the Invention

The present invention relates to an optical element such as a retardation plate, a polarizing plate, or a color filter for display, in particular, an optical element comprising, as a refractive index anisotropic layer, a liquid crystal layer comprising a liquid crystal composition containing a polymerizable liquid crystal material; and a method for manufacturing the same. In the specification and the claims, the term "liquid crystal layer" means a layer having an optical liquid crystal property, and the state of the layer may be a solid phase state that the molecular arrangement which a liquid crystal phase has is kept and solidified.

2. Description of the Related Art

In general, liquid crystal is used as a display medium, typical examples of which include TN (twisted nematic) and STN (super twisted nematic) type display elements, by use of reversible mobility of the molecular arrangement thereof. Besides, liquid crystal is used as an optical element, such as a retardation plate, a polarizing plate or a color filter for display, by use of the alignment and the refractive index anisotropy thereof.

In connection with the latter usage, in recent years, there have been proposed many optical elements which each has, as a refractive index anisotropic layer, a liquid crystal layer made of a polymerizable liquid crystal material. Specifically, for example, Japanese Patent Application National Publication No. 2002-533742 describes an optical element having functions of wavelength-selective reflectivity and polarization-selective reflectivity and is produced by use of a special polymerizable liquid crystal compound. Japanese Patent Application Laid-Open (JP-A) No. 5-215921 describes a birefringent plate produced by use of a polymerizable liquid crystal compound having a bar-like structure. Furthermore, JP-A Nos. 8-338913 and 9-152509 each describes an optical compensation sheet produced by use of a polymerizable liquid crystal compound having a disc-like structure.

Incidentally, as such an optical element, there is generally used an optical element in which a liquid crystal layer (a refractive index anisotropic layer) made of a polymerizable liquid crystal material is laminated over a support, such as a plastic film, so as to interpose an alignment layer therebetween.

The alignment layer arranged between the support and the refractive index anisotropic layer has alignment limiting force for limiting the alignment direction of liquid crystal molecules in the refractive index anisotropic layer. Such an alignment layer can be formed by forming a layer of a polymer (such as polyimide, polyvinyl alcohol, or gelatin) having alignment property onto a support, and then subjecting the polymer layer to alignment process such as rubbing treatment. When rubbing treatment is applied, as alignment process, to an alignment layer, static electricity or dust is generated in or on the surface of this layer; accordingly, methods have been researched for causing an alignment layer to express alignment limiting force without conducting rubbing treatment. One of them is a photo alignment method in which light in an arbitrary polarized light state (polarized light) is radiated onto an alignment layer, thereby generating alignment limiting force (anisotropy) on the surface of the alignment layer. The photo alignment method is classified into "photo isomerization", in which only the shape of molecules is changed to vary the alignment state thereof reversibly, and "photo reaction", in which molecules themselves are changed. The "photo reaction" of the latter is further classified into dimerization, decomposition, coupling, decomposition-coupling, and others.

About the above-mentioned optical element, which comprises a support, an alignment layer and a refractive index anisotropic layer, it is undoubtedly important that the optical property of each layer of the optical element is good. Besides, it is also important that the adhesive property between the layers of the optical element or the endurance of each of the layers is good. In connection with the latter subject, for example, if the adhesive property between an alignment layer and a refractive index anisotropic layer which constitute an optical element is poor, there arises a problem that the refractive index anisotropic layer is easily peeled from the alignment layer. When the optical element is used or stored at high temperature and high humidity, there also arises a problem that netlike shriverings are generated in the refractive index anisotropic layer.

In order to solve such problems, methods described below have been proposed hitherto.

JP-A No. 9-152509 proposes a method of using a modified polyvinyl alcohol as the material of an alignment layer and improving the adhesive property between the alignment layer and a refractive index anisotropic layer by chemical bond in the interface between the two layers. JP-A No. 10-10320 proposes a method of inserting an anchor coat layer between layers having a low adhesive property with each other, thereby improving the adhesive property between these layers. Furthermore, Japanese Patent Application National Publication No. 2000-514202 proposes a method of adding a monomer into a material for a refractive index anisotropic layer, thereby improving the endurance of the refractive index anisotropic layer. Specifically, there is proposed a method of incorporating, into a reactive mesogen compound as a material for a refractive index anisotropic layer, a non-mesogen compound having 2 or more polymerizable functional groups in an amount of 20% or less of the mesogen compound, thereby changing the glass transition temperature, the thermal stability and the mechanical stability of the layer.

Of the above-mentioned methods in the prior art, however, the method described in JP-A No. 9-152509 has the following problem: the boiling point of a solvent used for the modifying reaction of the polyvinyl alcohol is high and a solution containing this solvent cannot be used, as it is, as a coating solution; accordingly, a step of purifying the polyvinyl alcohol by the re-precipitation thereof is indispensable, so that costs for the production increase. The method described in JP-A No. 10-10320 has a problem that when a liquid crystal compound is used as the material of the refractive index anisotropic layer, the liquid crystal molecules are not satisfactorily aligned on the anchor coat layer. The method described in the Japanese Patent Application National Publication No. 2000-514202 has the following problem: when the alignment state of the liquid crystal molecules is fixed after the alignment process thereof so as to make the liquid crystal into a refractive index anisotropic layer, additives become impurities when the liquid crystal molecules are aligned; thus, the alignment of the liquid crystal molecules is hindered, so that the optical property thereof lowers (for example, display unevenness is generated.)

SUMMARY OF THE INVENTION

The present invention has been made in light of such a situation. An object thereof is to provide an optical element wherein a liquid crystal layer comprising a liquid crystal composition containing a polymerizable liquid crystal material is used as a refractive index anisotropic layer, the optical element being capable of heightening the adhesive property between the refractive index anisotropic layer and an alignment property providing layer for providing alignment property to the refractive index anisotropic layer, and further improving the endurance of each of the layers; and a method for manufacturing the same.

As first resolving means, the present invention provides an optical element comprising a transparent base material, an alignment property providing layer laminated on the transparent base material, and a refractive index anisotropic layer laminated on the alignment property providing layer and having an alignment property provided by alignment limiting force of the alignment property providing layer, wherein the alignment property providing layer is made of alignment layer comprising an alignment layer composition capable of expressing the alignment limiting force, the alignment layer composition comprises a polymer and a monomer or oligomer having one or more functional groups, wherein the refractive index anisotropic layer is made of a liquid crystal layer formed by curing a liquid crystal composition comprising a polymerizable liquid crystal material, and in the alignment property providing layer and the refractive index anisotropic layer, the monomer or oligomer in the alignment property providing layer and the polymerizable liquid crystal material in the refractive index anisotropic layer are crosslinked with each other near an interface between the layers.

According to the first resolving means, it is preferred that the alignment property providing layer is an alignment layer comprising the alignment layer composition capable of expressing the alignment limiting force by a photo alignment method. It is preferred that the polymer comprised in the alignment layer composition for forming the alignment property providing layer is a polymer having at least one of cinnamate and coumalin.

According to the first resolving means, it is also preferred that the monomer or oligomer comprised in the alignment layer composition for forming the alignment property providing layer is isocyanuric acid (meth)acrylate.

According to the first resolving means, it is also preferred that the monomer or oligomer comprised in the alignment layer composition for forming the alignment property providing layer is a polymerizable liquid crystal material. It is preferred that the polymerizable liquid crystal material in the alignment property providing layer and the polymerizable liquid crystal material in the refractive index anisotropic layer are of the same kind.

According to the first resolving means, the weight of the monomer or oligomer comprised in the alignment layer composition for forming the alignment property providing layer is preferably from 0.01 to 3 times that of the polymer, more preferably from 0.05 to 1.5 times that of the polymer.

As second resolving means, the present invention provides a method for manufacturing an optical element, comprising: a step of forming an alignment property providing layer as an alignment layer on a transparent base material, in which an alignment layer composition comprising a polymer and a monomer or an oligomer having one or more functional groups is applied onto the transparent base material to express an alignment limiting force on a surface thereof; a step of applying a liquid crystal composition comprising a polymerizable liquid crystal material onto the alignment property providing layer formed on the transparent base material, and a step of forming a refractive index anisotropic layer, in which the liquid crystal composition applied onto the alignment property providing layer on the transparent base material is cured to provide an alignment property to the alignment property providing layer by the alignment limiting force of the alignment property providing layer; wherein in the step of forming the refractive index anisotropic layer, the alignment property providing layer together with the liquid crystal composition is cured to crosslink the monomer or the oligomer in the alignment property providing layer and the polymerizable liquid crystal material in the refractive index anisotropic layer with each other near an interface between the alignment property providing layer and the refractive index anisotropic layer. The "functional group(s)" that the monomer or oligomer has is one or more groups which can react with the polymerizable group that the polymerizable liquid crystal material has.

According to the second resolving means, it is preferred that the alignment property providing layer formed on the transparent base material is made of the alignment layer composition capable of expressing the alignment limiting force by a photo alignment method. It is preferred that the polymer comprised in the alignment layer composition for forming the alignment property providing layer is a polymer having at least one of cinnamate and coumalin.

According to the second resolving means, it is also preferred that the monomer or oligomer comprised in the alignment layer composition for forming the alignment property providing layer is a polymerizable liquid crystal material. It is preferred that the polymerizable liquid crystal material in the alignment property providing layer and the polymerizable liquid crystal material in the refractive index anisotropic layer are of the same kind.

According to the second resolving means, the weight of the monomer or oligomer comprised in the alignment layer composition for forming the alignment property providing layer is preferably from 0.01 to 3 times that of the polymer, more preferably from 0.05 to 1.5 times that of the polymer.

As third resolving means, the present invention provides an alignment layer composition for forming an alignment layer for providing alignment property to a liquid crystal layer formed by curing a liquid crystal composition comprising a polymerizable liquid crystal material, comprising a polymer, and a monomer or oligomer having one or more functional groups, wherein the monomer or oligomer is capable of being crosslinked with the polymerizable liquid crystal material in the liquid crystal layer.

According to the third resolving means, the polymer is preferably a polymer having at least one of cinnamate and coumalin.

According to the third resolving means, the monomer or oligomer is preferably a polymerizable liquid crystal material.

According to the third resolving means, the weight of the monomer or oligomer is preferably from 0.01 to 3 times that of the polymer, more preferably from 0.05 to 1.5 times that of the polymer.

According to the present invention, a monomer or oligomer having one or more functional groups is added to an alignment layer composition for forming an alignment property providing layer for providing alignment property to a refractive index anisotropic layer, whereby the monomer or oligomer in the alignment property providing layer is crosslinked with molecules in the refractive index anisotropic layer adjacent to the alignment property providing layer near an interface between the alignment property providing layer and the refractive index anisotropic layer. It is, therefore, possible to improve the adhesive property between the alignment property providing layer and the refractive index anisotropic layer. A monomer or oligomer having two or more functional groups is added to the above-mentioned alignment layer composition, whereby the structure of the alignment property providing layer made of the alignment layer composition becomes a strong network structure. It is therefore possible to improve the strength of the alignment property providing layer itself. In this way, the finally-produced optical element becomes an optical element excellent in the adhesive property between the alignment property providing layer and the refractive index anisotropic layer and in the endurance of each of the layers. It is consequently possible to solve effectively problems that the refractive index anisotropic layer is peeled and further a rise in the haze and the appearance of unevenness are caused on the basis of poor alignment, and other problems.

DETAILED DESCRIPTION OF THE PREFERRED EMBODIMENTS

Embodiments of the present invention will be described with reference to the drawings.

First, the structure of an optical element according to an embodiment of the invention is described with reference to FIG. 1.

Figure 1:
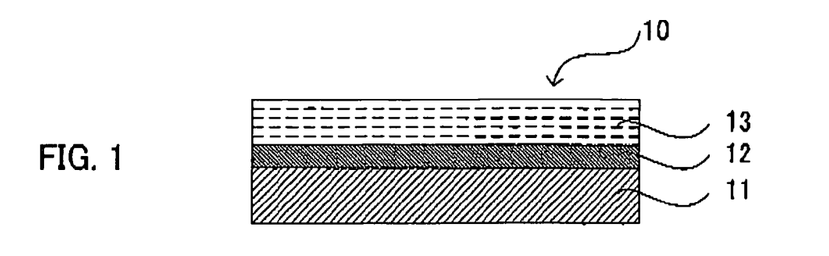
FIG. 1 is a sectional view schematically showing an optical element according to an embodiment of the present invention.

As shown in FIG. 1, the optical element according to the present embodiment is an optical element 10 having a transparent base material 11, an alignment property providing layer 12 laminated on the transparent base material 11, and a refractive index anisotropic layer 13 laminated on the alignment property providing layer 12.

Of these members, the transparent base material 11 is a support for supporting the alignment property providing layer 12 and the refractive index anisotropic layer 13, and is made of glass, a transparent resin film, or the like. The transparent resin film may be a film made of a cellulose resin such as triacetylcellulose (TAC), diacetylcellulose or acetate butyrate cellulose, a polyester resin such as polyethylene terephthalate (PET) or polyester, an olefin resin such as polyethylene, polyacrylic resin, polyurethane resin, polyethersulfone, polycarbonate, polysulfone, polyether, polymethylpentene, polyetherketone, (meth)acrylonitrile, or the like. As the transparent resin film, a film made of triacetate cellulose (TAC) having no birefringence is preferably used.

The transparent base material 11 preferably has a thickness of about 25 to 1000 µm. The transparent base material 11 may be a continuous long film having a provided length, more specifically, a continuous film which is in general industrially used and is supplied in a roll-wounded form. The length of the long film can be selected at will. When the film is in a roll-wounded form, the length thereof can be set to, for example, a large length of approximately 10000 m.

The alignment property providing layer 12 is an alignment layer having alignment limiting force for providing alignment property to the refractive index anisotropic layer 13, and is made of an alignment layer composition capable of expressing the alignment limiting force. The thickness of the alignment property providing layer 12 is preferably from about 0.01 to 0.5 µm.

For the alignment layer composition for forming the alignment property providing layer 12, a polymer, a coupling agent and so on may be used. Specific examples of the polymer include polymethyl methacrylate, acrylic acid-methacrylic acid copolymer, styrene-maleimide copolymer, polyvinyl alcohol, modified polyvinyl alcohol, gelatin, styrene-vinyl toluene copolymer, chlorosulfonated polyethylene, nitrocellulose, polyvinyl chloride, chlorinated polyolefine, polyester, polyimide, vinyl acetate-vinyl chloride copolymer, ethylene-vinyl acetate copolymer, carboxymethylcellulose, polyethylene, polypropylene, and polycarbonate. An example of the coupling agent is a silane coupling agent.

The method for causing the alignment property providing layer 12, which is made of such an alignment layer composition, to express alignment limiting force may be a method of subjecting the alignment property providing layer 12 to alignment process such as rubbing treatment, or a method of using a photo alignment method to subject the layer to alignment process. The photo alignment method is a method of radiating light in an arbitrary polarized light state (polarized light) onto an alignment layer, thereby expressing alignment limiting force (anisotropy) onto the surface of the alignment layer. As described above, the photo alignment method is classified into "photo isomerization", in which only the shape of molecules is changed to vary the alignment state thereof reversibly, and "photo reaction", in which molecules themselves are changed. The "photo reaction" of the latter is further classified into dimerization, decomposition, coupling, decomposition-coupling, and others. Of these, the method for the "dimerization", which is generally used as the photo alignment method, is described as an example. According to this method, light in an arbitrary polarized light state (polarized light) is radiated onto an alignment layer, whereby a chemical reaction such as dimerization reaction is caused in the polarization direction thereof on the surface of the alignment layer, so as to express alignment limiting force. A typical example of the polymer which expresses alignment limiting force by such "dimerization" is polyvinyl cinnamate (PVCi). In polyvinyl cinnamate (PVCi), for example, radiation of polarized ultraviolet rays causes double bond moieties of two side chains parallel to the polarized rays to be opened by dimerization reaction, and then the bonds are recoupled with each other. Other preferred examples of the polymer which expresses alignment limiting force by such "dimerization" include polymers having a cinnamoyl group, a coumalin group, or a chalcone group (see, for example, JP-A Nos. 7-138380 and 10-324690). Examples of the polymer which expresses alignment limiting force by the above-mentioned "dimerization" include polymers having cinnamate, coumalin, benzilidenephthalimidine, benzilideneacetophenone, diphenylacetylene, stylbazole, uracil, quinolinone, maleimide, or a cinnamilidene acetic acid derivative. Of these, polymers having cinnamate or coumalin, and polymers having cinnamate and coumalin are preferred in the present invention (see, for example, JP-A No. 9-118717, and Japanese Patent Application National Publication Nos. 10-506420 and 2003-505561).

The cinnamate and coumalin used in the present invention are preferably represented by the following formulae Ia and Ib:

wherein A represents pyrimidine-2,5-diyl, pyridine-2,5-diyl, 2,5-thiophenylene, 2,5-furanylene, or 1,4- or 1,6-naphthylene, or represents unsubstituted phenylene, or phenylene mono- or multi-substituted with one or more fluorine atoms, chlorine atoms, or cyclic, linear or branched alkyl residues which each have 1 to 18 carbon atoms (and which are each unsubstituted, or mono- or multi-substituted with one or more fluorine atoms or chlorine atoms, one or more out of their —CH$_2$— groups which are not adjacent to each other being allowed to be independently substituted with a group C [wherein C represents a group selected from —O—, —CO—, —CO—O—, —O—CO—, —NR$^1$—, —NR$^1$—CO—, —CO—NR$^1$—, —NR$^1$—CO—O—, —O—CC—NR$^1$—, —NR$^1$—CO—NR$^1$—, —CH=CH—, —C≡C—, —O—CO—O— and —Si(CH$_3$)$_2$—O—Si(CH$_3$)$_2$— wherein R$^1$ represents a hydrogen atom or a lower alkyl]);

B represents a hydrogen atom, or a group capable of reacting or interacting with a second material (such as a polymer, an oligomer, a monomer, an photoactive polymer, an photoactive oligomer, and/or an photoactive monoaner), or a surface;

S$_1$ and S$_2$ each independently represent a single bond or a spacer unit, such as a linear or branched alkylene group having 1 to 40 carbon atoms (and is unsubstituted, or mono- or multi-substituted with one or more fluorine or chlorine atoms, one or more out of its —CH$_2$— groups which are not adjacent to each other being allowed to be independently substituted with a group D [wherein D represents a group selected from —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O— and —Si(CH$_3$)$_2$—O—Si(CH$_3$)$_2$— [wherein R$^1$ represents a hydrogen atom or a lower alkyl], an aromatic group, or an alicyclic group] but any two of the oxygen atoms therein being not directly bonded to each other);

Q represents an oxygen atom or —NR$^1$— [wherein R$^1$ represents a hydrogen atom or a lower alkyl]; and X and Y each independently represent hydrogen, fluorine, chlorine, cyano, or an alkyl having 1 to 12 carbon atoms (and may be substituted with fluorine, one or more out of its —CH$_2$— groups which are not adjacent to each other being allowed to be substituted with —O—, —CO—O—, —O—CO— and/or —CH=CH—).

Of all of cinnamate and coumalin represented by the above-mentioned formulae in the invention, compounds described in Japanese Patent Application National Publication No. 2004-536185 are preferably used.

A monomer or oligomer having one or more functional groups, besides the above-mentioned polymer, is added into the above-mentioned alignment layer composition. As the monomer or oligomer, a single selected from the following or a mixture of two or more therefrom can be used: monofunctional monomers having an acrylic functional group (such as reactive ethyl (meth)acrylate, ethylhexyl (meth)acrylate, styrene, methylstyrene, and N-vinylpyrrolidone); and polyfunctional monomers having the same (such as polymethylolpropane tri(meth)acrylate, hexanediol (meth)acrylate, triethylene(polypropylene) glycol diacrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, and isocyanuric acid poly(meth)acrylate (such as isocyanuric acid EO diacrylate), bisphenolfluorene derivatives (such as bisphenoxyethanolfluorene diacrylate and bisphenolfluorene diepoxy acrylate)).

If the adhesive property between the alignment property providing layer 12 and the refractive index anisotropic layer 13 is sufficiently improved, the added amount of the above-mentioned monomer(s) or the oligomer(s) can be adjusted at will as long as the optical property of the optical element 10 is not damaged. In general, the weight thereof is preferably from 0.01 to 3 times (inclusive) that of the solid content (polymer), more preferably from 0.05 to 1.5 times (inclusive) that of the solid content for the following reasons: if the weight thereof is not more than 0.01 time, the effect of improving the adhesive property between the alignment property providing layer 12 and the refractive index anisotropic layer 13 is not sufficiently expressed; on the other hand, if the weight thereof is more than 3 times, the effect of improving the adhesive property between the alignment property providing layer 12 and the refractive index anisotropic layer 13 is sufficient but sufficient alignment may not be provided to the refractive index anisotropic layer 13. In other words, the refractive index anisotropic layer 13 is yielded through a process of the alignment of liquid crystal molecules and the fixation of the alignment state thereof, as will be described later; the above-mentioned monomer or oligomer becomes an alignment-hindering material when the liquid crystal molecules are aligned; therefore, a rise in the haze, the appearance of unevenness, and others based on poorness in the alignment are caused, so that the optical function of the liquid crystal is damaged.

The above-mentioned monomer or oligomer is preferably a polymerizable liquid crystal material. The monomer or oligomer of such polymerizable liquid crystal material is in particular preferably equal in kind to the polymerizable liquid crystal material comprised in the refractive index anisotropic layer 13.

When the transparent base material 11 is a long film and the film is wounded into a roll form when the alignment property providing layer 12 is laminated on the transparent base material 11, it is preferred that the kind and the added amount of the above-mentioned monomer or oligomer are appropriately adjusted to make the alignment property providing layer 12 into the state of a solid analog at ambient temperature. In this case, it is preferred to use, as the monomer or oligomer, a monomer or oligomer which is solid at ambient temperature (20 to 25° C.). According to this, a problem of blocking, which is caused by a phenomenon that the alignment property providing layer 12 is stuck onto the rear face of the transparent base material 11, is not caused even if the transparent base material 11 is wounded into a roll form when the alignment property providing layer 12 is laminated on the substrate 11.

The refractive index anisotropic layer 13 is an optically functional layer for realizing the function of a retardation plate, a polarizing plate, a color filter for display, or the like, and is a liquid crystal layer formed by curing (polymerizing)

a liquid crystal composition comprising a polymerizable liquid crystal. The thickness of the refractive index anisotropic layer 13 is decided in accordance with a desired optical property.

It is preferred that the liquid crystal composition for forming the refractive index anisotropic layer 13 contains arbitrary additives (such as a polymerization initiator, a plasticizer, a surfactant, and a silane coupling agent), besides one or more selected from polymerizable liquid crystal materials which will be shown below, as long as the additives do not affect the alignment or the optical property of the liquid crystal. The added amount of the additives is appropriately adjusted in accordance with the liquid crystal material in the liquid crystal composition, or the like. In general, it is preferred that the amount is from 0.001 to 10% by weight (inclusive) of the solid content (polymerizable liquid crystal material). This liquid crystal composition can be applied, as it is, onto the alignment property providing layer 12. However, the composition may be dissolved in an appropriate solvent such as an organic solvent in order to match the viscosity of the composition with an applicator used, or obtain a good alignment state.

As the polymerizable liquid crystal material comprised in the above-mentioned liquid crystal composition, a nematic liquid crystal compound having nematic regularity is preferably used. Specifically, for example, the following can be appropriately used: compounds described in JP-A Nos. 7-258638 and 2003-287623, and Japanese Patent Application National Publication No. 10-508882. More specifically, compounds as represented by the following chemical formulae (1) to (10) are preferably used:

However, the nematic liquid crystal compound used in the present embodiment is not limited to the above-mentioned compounds and may be any liquid crystal compound that has nematic liquid crystal property and further has, at its one or more terminals, one or more functional groups (such as ultraviolet-curable, polymerizable groups). A mixture of two or more that are appropriately selected from the above-mentioned nematic liquid crystal compounds may be used.

Figure 2:
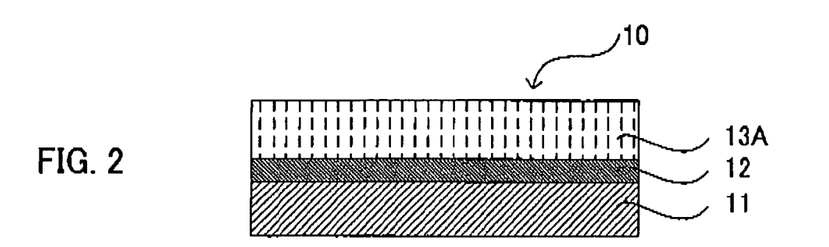
FIG. 2 is a sectional view schematically showing a modified example of the optical element shown in FIG. 1.

The liquid crystal composition comprising such a nematic liquid crystal compound is applied onto the alignment property providing layer 12 by a method which will be described later, and then cured (polymerized) by the radiation of ultraviolet rays or the like. The refractive index anisotropic layer 13 which is finally formed in this way is a liquid crystal layer as shown in FIG. 1, in which nematic liquid crystal molecules are fixed in the state that the molecules are aligned in parallel to the transparent base material 11, and may be such a refractive index anisotropic layer 13A as shown in FIG. 2, that is, a liquid crystal layer in which nematic liquid crystal molecules are fixed in the state that the molecules are aligned perpendicularly to the transparent base material 11. The liquid crystal structure of the refractive index anisotropic layer 13 shown in FIG. 1 is a homogeneous structure (parallel alignment structure), and this structure can give an optically functional layer called an "A plate". On the other hand, the liquid crystal structure of the refractive index anisotropic layer 13A shown in FIG. 2 is a homeotropic structure (perpendicular alignment structure). This structure can give an optically functional layer called a "positive (+) C plate".

As the polymerizable liquid crystal material comprised in the liquid crystal composition, a mixture of a polymerizable nematic liquid crystal compound as described above and a chiral agent may be used (see JP-A No. 2003-287623). The chiral agent is used in order to induce a helical structure to nematic regularity expressed by the nematic liquid crystal compound. As long as this purpose is attained, the chiral agent may be any chiral agent that is compatible with the nematic liquid crystal compound in a solution state or a melted state and can induce a desired helical structure to the nematic liquid crystal compound without damaging the liquid crystal property of this liquid crystal compound. Specifically, it is preferred to use a low molecular compound having, in the molecule thereof, axial asymmetry, as represented by the following general formula (11), (12) or (13):

(11)

(12)

(13)

(e = an integer of 2 to 5.)

(i) (ii) (iii) (iv) (v) (vi) (vii) (viii)

In the general formula (11) or (12), $R^4$ represents hydrogen or a methyl group. Y represents any one of the above-mentioned formulae (i) to (xxiv). Any one of the formulae (i), (ii), (iii), (v) and (vii) is particularly preferred. Symbols c and d, which each represents the chain length of the alkylene group, may be each an integer ranging from 2 to 12, preferably from 4 to 10, and more preferably from 6 to 9. The compound represented by the formula (11) or (12) in which c or d is 0 or 1 is insufficient in stability and is easily hydrolyzed. The compound is also high in crystallinity. On the other hand, the compound in which c or d is 13 or more has a low melting point (Tm). These compounds are low in compatibility with the polymerizable liquid crystal material having nematic regularity. Thus, phase separation may be caused in accordance with the concentration thereof. It is particularly unnecessary that such a chiral agent has polymerizability. However, when the chiral agent has polymerizability, the agent is polymerized together with the polymerizable liquid crystal material having nematic regularity so that cholesteric regularity is stably fixed. Accordingly, this case is very preferable from the viewpoint of thermal stability or others. In order to obtain the refractive index anisotropic layer 13 having good heat resistance, it is particularly preferred that the chiral agent has polymerizable functional groups at both terminals of the molecule thereof.

Figure 3:
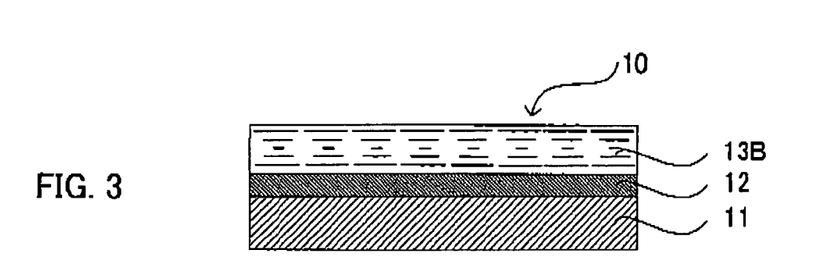
FIG. 3 is a sectional view schematically showing another modified example of the optical element shown in FIG. 1.

In this case, a refractive index anisotropic layer which is finally formed on the alignment property providing layer 12 is such a refractive index anisotropic layer 13B as shown in FIG. 3, that is, a liquid crystal layer in which nematic liquid crystal molecules are fixed in a helical structure state that the molecules are planar-aligned to the transparent base material 11 (a state having cholesteric regularity). In this case, the liquid crystal structure of the refractive index anisotropic layer 13B becomes a cholesteric structure. This structure can give an optically functional layer called a "negative (−) Cplate".

Figure 4:
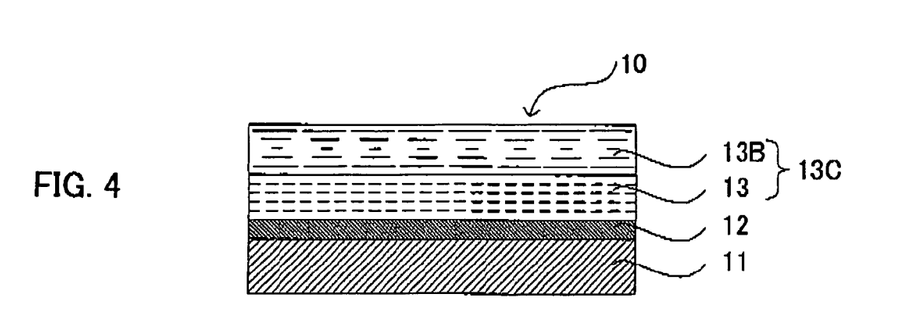
FIG. 4 is a sectional view schematically showing a further modified example of the optical element shown in FIG. 1.

The refractive index anisotropic layer which is finally formed on the alignment property providing layer 12 may be such a refractive index anisotropic layer 13C as shown in FIG. 4, that is, a layer in which the refractive index anisotropic layer 13 shown in FIG. 1 and the refractive index anisotropic layer 13B shown in FIG. 4 are laminated onto each other. Besides this, a layer in which two or more layers of the same kind or different kinds out of the liquid crystal layers 13, 13A and 13B shown in FIGS. 1, 2 and 3 are laminated onto each other may be used.

Figure 5:
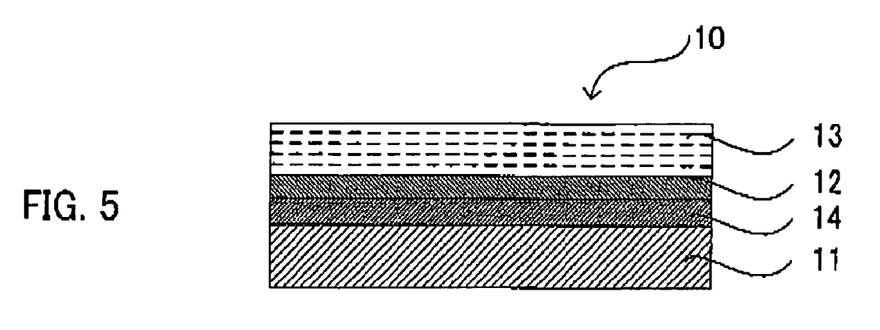
FIG. 5 is a sectional view schematically showing an even further modified example of the optical element shown in FIG. 1.

As shown in FIG. 5, a barrier layer (intermediate layer) 14 may be formed between the alignment property providing layer 12 and the refractive index anisotropic layer 13 in order to block the elution of the plasticizer and so on contained in the transparent base material 11 and the others. Examples of the material of the barrier layer 14 include ultraviolet curable acrylic urethane resin, ultraviolet curable polyester acrylate resin, ultraviolet curable epoxy acrylate resin, ultraviolet curable polyol acrylate resin, and ultraviolet curable epoxy resin. In general, the ultraviolet curable acrylic urethane resin can easily be obtained by causing a polyester polyol to react with an isocyanate monomer or prepolymer to yield a product, and then causing the product to react with an acrylate monomer having a hydroxy group, such as 2-hydroxyethyl acrylate or 2-hydroxyethyl methacrylate (hereinafter, the term "acrylate" includes the meaning of "methacrylate" as well as that of "acrylate"), or 2-hydroxypropyl acrylate. In general, the ultraviolet curable polyester acrylate resin can easily be obtained by causing a polyol (such as polyester polyol) to react with 2-hydroxyethyl acrylate or a 2-hydroxyacrylate based monomer. A specific example of the ultraviolet curable epoxy acrylic resin is a product obtained by preparing an oligomer of epoxyacrylate, adding a reactive diluting agent and a photoreaction initiator to this oligomer, and then causing the oligomer to react. Examples of this photoreaction initiator include benzoin derivatives, oxime ketone derivatives, benzophenone derivatives, and thioxanthone derivatives. One or more selected therefrom maybe used. Specific examples of the ultraviolet curable polyol acrylate resin include trimethylolpropane triacrylate, ditrimethylolpropane tetraacrylate, pentaerythritol triacrylate, pentaerythritol tetraacrylate, dipentaerythritol hexaacrylate, alkyl-modified dipentaerythritol pentaacrylate, bis(acryloxyethyl)isocyanurate, and tri(acryloxyethyl)isocyanurate. These resins are usually used together with a known photosensitizer.

When an improvement in the adhesive property between the barrier layer 14 and the alignment property providing layer 12 is considered, it is preferred to add, as the material of the barrier layer 14, a monomer or oligomer that is equal in kind to the monomer or oligomer having one or more functional groups and is added to the alignment layer composition for forming the alignment property providing layer 12. According to this, the monomer or oligomer contained in the barrier layer 14 is crosslinked with molecules in the alignment property providing layer 12 adjacent to the barrier layer 14, whereby the adhesive property between the barrier layer 14 and the alignment property providing layer 12 can be improved in the same manner as in the above-mentioned case (the case that the adhesive property between the alignment property providing layer 12 and the refractive index anisotropic layer 13 is improved).

Instead of the barrier layer 14, an intermediate layer such as an adhesive layer may be formed in order to improve the adhesive properly between the transparent base material 11 and the alignment property providing layer 12.

The following will describe a method for manufacturing the optical element 10 having such a structure with reference to FIGS. 6A to 6G.

Figure 6A:
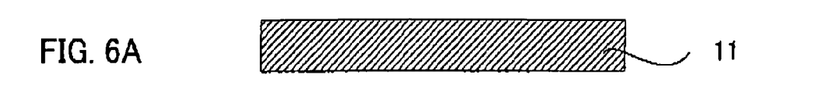
FIGS. 6A to 6G are process charts for explaining a manufacturing method of an optical element according to an embodiment of the present invention.
Figure 6B:
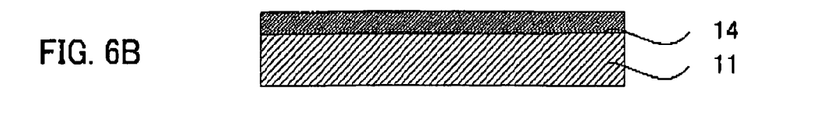

For example, a transparent resin film is first prepared as a transparent base material 11 (FIG. 6A). Next, a barrier layer 14 is formed on one of the surfaces of this transparent base material 11 (FIG. 6B).

When, for example, an ultraviolet curable resin is used as the material of the barrier layer 14 formed on the transparent base material 11, the composition for the barrier layer is applied thereto and then cured (polymerized) by the irradiation thereof with ultraviolet rays or the like.

Figure 6C:
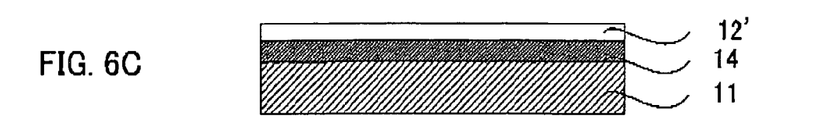

Next, an alignment layer composition comprising a polymer and a monomer or oligomer having one or more functional groups (and, preferably, a coupling agent) is applied onto the barrier layer 14 formed on the transparent base material 11, so as to form a coating film 12' made of the alignment layer composition (FIG. 6C). At this time, the alignment layer composition is dissolved into an organic solvent, and the resultant solution of the alignment layer composition is applied. Examples of the method used for the application include spin coating, bar coating, extrusion coating, direct gravure coating, reverse gravure coating, and die coating. However, the method is not limited thereto.

Figure 6D:
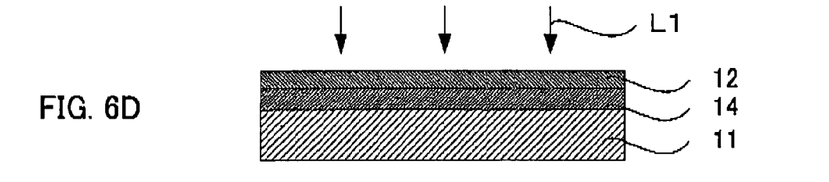

Thereafter, the coating film 12' made of the alignment layer composition and formed on the barrier layer 14 in this way is subjected to heating and drying treatment, and then the added monomer or oligomer is cured while the absorption wavelengths of the alignment layer composition are cut. Thereafter, the resultant is subjected to treatment of radiating ultraviolet rays L1 in an arbitrary polarized light state, rubbing treatment or some other treatment. In this way, alignment limiting force is expressed on the surface of the coating film 12' of the alignment layer composition. Thus, an alignment property providing layer 12 is formed as an alignment layer (FIG. 6D).

Figure 6E:
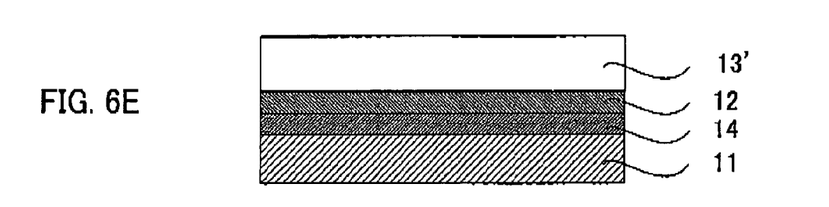

Next, a liquid crystal composition comprising a polymerizable liquid crystal material is applied onto the alignment property providing layer 12 formed on the barrier layer 14 in this way, so as to form a coating film 13' made of the liquid crystal composition (FIG. 6E). At this time, the liquid crystal composition is dissolved into an organic solvent, and the resultant liquid crystal composition solution is applied. Examples of the method used for the application include spin coating, bar coating, extrusion coating, direct gravure coating, reverse gravure coating, and die coating. However, the method is not limited thereto.

Figure 6F:
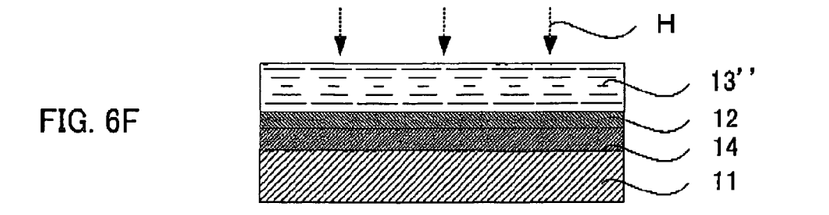
Figure 6G:
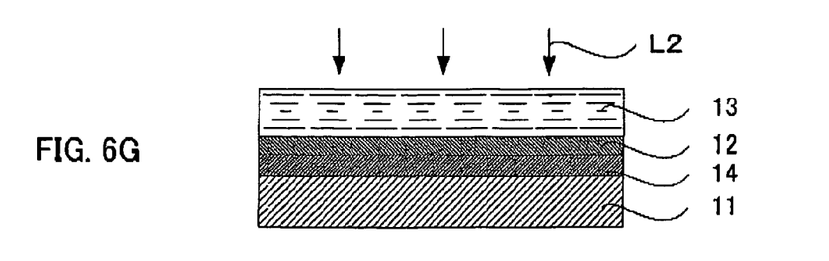

Thereafter, heat H is applied to the coating film 13' made of the liquid crystal composition and formed on the alignment property providing layer 12 in this way, thereby subjecting the film 13' to heating and drying treatment. The alignment direction of the liquid crystal molecules in the coating film 13' of the liquid crystal composition is regulated by the alignment limiting force expressed on the alignment property providing layer 12 surface. In this way, a coating film 13" of the liquid crystal composition to which alignment property is provided is formed (FIG. 6F).

In a nitrogen atmosphere, ultraviolet rays L2 are radiated as energy radiation onto the coating film 13" of the liquid crystal composition to which the alignment property is provided in this way, thereby curing the coating film 13" of the liquid crystal composition to fix the alignment state of the liquid crystal molecules. In this way, a refractive index anisotropic layer 13, which is a liquid crystal layer in which the alignment state of the liquid crystal molecules is fixed, is formed on the alignment property providing layer 12 (FIG. 6G)). The ultraviolet rays L2 are preferably rays containing wavelengths ranging from 100 to 450 nm, more preferably rays containing wavelengths ranging from 250 to 400 nm. The rays having wavelengths within this range can easily be obtained from an ordinary light source. When a polymerization initiator which is widely commercially available is used, a chemical reaction, such as ultraviolet curing reaction, can be more easily and effectively attained. The energy radiation used to cure the coating film 13" of the liquid crystal composition may be any energy radiation which is capable of curing the above-mentioned polymerizable liquid crystal material. Besides the ultraviolet rays, an electron beam, visible rays, infrared rays or the like can be appropriately used in accordance with conditions. However, the ultraviolet rays are preferred from the viewpoint of easiness of the process therefor or the like.

As described above, according to the present embodiment, the monomer or oligomer having has one or more functional groups is added to the alignment layer composition for forming the alignment property providing layer 12 for providing alignment property to the refractive index anisotropic layer 13; therefore, the structure of the alignment property providing layer 12 made of the alignment layer composition becomes a strong network structure so that the strength of the alignment property providing layer 12 itself can be improved. Moreover, the monomer or oligomer in the alignment property providing layer 12 is crosslinked with the molecules in the refractive index anisotropic layer 13, which is adjacent to the alignment property providing layer 12, near the interface between the alignment property providing layer 12 and refractive index anisotropic layer 13; therefore, the adhesive property between the alignment property providing layer 12 and the refractive index anisotropic layer 13 can be improved. As a result, the finally-produced optical element 10 is excellent in the adhesive property between the alignment property providing layer 12 and the refractive index anisotropic layer 13, and further the endurance of each of the layers therein is also excellent. It is therefore possible to solve effectively problems that the refractive index anisotropic layer 13 is peeled and further a rise in the haze, the appearance of unevenness, and others are caused on the basis of poorness in the alignment thereof.

Furthermore, when the monomer or oligomer added to the alignment layer composition is a polymerizable liquid crystal material and further this polymerizable liquid crystal material is equal in kind to the polymerizable liquid crystal material comprised in the refractive index anisotropic layer 13, the monomer or oligomer in the alignment property providing layer 12 is more easily crosslinked with the molecules in the refractive index anisotropic layer 13, which is adjacent to the alignment property providing layer 12. As a result, the adhesive property between the alignment property providing layer 12 and the refractive index anisotropic layer 13 can be further improved according to the present embodiment.

EXAMPLES

The following will describe specific examples of the above-mentioned embodiments.

Example 1

Cyclohexanone (98 parts by weight) was added to an alignment layer composition containing a polymer having a cinnamoyl group (1.0 part by weight) and the polymerizable nematic liquid crystal compound monomer represented by the chemical formula (1) (1.0 part by weight), and the composition was dissolved therein to yield a solution of the alignment layer composition. A pentaerythritol acrylate (PETA) monomer was applied onto a long triacetylcellulose (TAC) film (thickness: 80 μm), and then irradiated with ultraviolet rays, so as to be cured, thereby forming a barrier layer of 7 μm thickness on the TAC film. The solution yielded as described above was applied onto the barrier layer formed on the TAC film with a wire bar coater, and then the resultant layer was dried with hot wind of 80° C. temperature for 2 minutes, so as to yield a coating film of 0.1 μm thickness. This coating film was irradiated with polarized ultraviolet rays at 10 mJ/cm$^2$ to form an alignment layer in which alignment limiting force was expressed on its surface.

Next, a liquid crystal composition containing the same polymerizable nematic liquid crystal compound monomer as added to the alignment layer composition solution was dissolved into a solution of toluene at a ratio of 20% by mass. Furthermore, thereto was added a polymerization initiator (IRGACURE-907 (trade name), manufactured by Chiba Speciality Chemicals) to yield a solution of the liquid crystal composition. This solution was applied onto the alignment layer formed in the above-mentioned step with a wire bar coater, and the resultant was dried to yield a coating film of 1 μm thickness. Next, this coating film was heated at 85° C. for 2 minutes to align the liquid crystal molecules in the coating film by the alignment limiting force expressed on the surface of the alignment layer. Thereafter, a high-pressure mercury lamp was used to radiate ultraviolet rays at 100 mJ/cm$^2$ onto the coating film in a nitrogen atmosphere, thereby curing the coating film together with the alignment layer to fix the alignment state of the liquid crystal molecules. In this way, a nematic liquid crystal layer was formed on the alignment layer, so that an optical element according to Example 1 was finally produced.

Example 2

A nematic liquid crystal layer was formed on an alignment layer to manufacture an optical element according to Example 2 finally in the same way as in Example 1 except that the polymerizable nematic liquid crystal compound monomer added to the alignment layer composition therein was changed to isocyanuric acid EO modified diacrylate.

Example 3 n-Methylpyrrolidone (98 parts by weight) was first added to an alignment layer composition comprising polyimide (1.0 part by weight) and the polymerizable nematic liquid crystal compound monomer represented by the chemical formula (1) (1.0 part by weight), and the composition was dissolved therein to yield a solution of the alignment layer composition. A pentaerythritol acrylate (PETA) monomer was applied onto a long triacetylcellulose (TAC) film (thickness: 80 μm), and then irradiated with ultraviolet rays, so as to be cured, thereby forming a barrier layer of 7 μm thickness on the TAC film. The solution yielded as described above was applied onto the barrier layer formed on the TAC film with a spin coater, and then the resultant layer was dried with hot wind of 100° C. temperature for 1 minute, so as to yield a coating film of 1 μm thickness. This coating film was subjected to rubbing treatment to form an alignment layer in which alignment limiting force was expressed on its surface.

Next, a nematic liquid crystal layer was formed onto the alignment layer formed as described above in the same way as in Example 1, so as to manufacture an optical element according to Example 3 finally.

Example 4

An alignment layer was first formed on a triacetylcellulose (TAC) film having a barrier layer in the same way as in Example 1.

Next, a liquid crystal composition comprising the same polymerizable nematic liquid crystal compound monomer as added to the alignment layer composition was dissolved into a toluene solution to give a ratio of 20% by mass. Furthermore, thereto were added a chiral agent (the compound represented by the chemical formula (2)) and a polymerization initiator (IRGACURE-907 (trade name), manufactured by Chiba Speciality Chemicals), so as to yield a liquid crystal composition solution. This solution was applied onto the alignment layer formed in the above-mentioned step with a wire bar coater, and the resultant layer was dried to yield a coating film of 1 μm thickness. Next, this coating film was heated at 85° C. for 2 minutes to align the liquid crystal molecules in the coating film by the alignment limiting force expressed on the surface of the alignment layer. Thereafter, a high-pressure mercury lamp was used to radiate ultraviolet rays onto the resultant at 100 mJ in a nitrogen atmosphere, thereby curing the coating film together with the alignment layer to fix the alignment state of the liquid crystal molecules. In this way, a cholesteric liquid crystal layer was formed on the alignment layer to manufacture an optical element according to Example 4 finally.

Comparative Example

Cyclohexanone (98 parts by weight) was added to an alignment layer composition containing a polymer having a cinnamoyl group (2.0 parts by weight) and the composition was dissolved therein to yield a solution of the alignment layer composition. In the same way as in Example 1, this solution was applied onto a barrier layer formed on a long triacetylcellulose (TAC) film (thickness: 80 μm) with a wire bar coater, and then the resultant layer was dried with hot wind of 80° C. temperature for 2 minutes, so as to yield a coating film of 0.1 μm thickness. This coating film was irradiated with polarized ultraviolet rays at 10 mJ/cm$^2$ to form an alignment layer in which alignment limiting force was expressed on its surface.

Next, a liquid crystal composition comprising the polymerizable nematic liquid crystal compound monomer represented by the chemical formula (1) was dissolved into a toluene solution to give a ratio of 20% by mass. Furthermore, thereto was added a polymerization initiator (IRGACURE-907 (trade name), manufactured by Chiba Speciality Chemicals), so as to yield a liquid crystal composition solution. This solution was applied onto the alignment layer formed in the above-mentioned step with a wire bar coater, and the resultant layer was dried to yield a coating film of 1 μm thickness. Next, this coating film was heated at 85° C. for 2 minutes to align the liquid crystal molecules in the coating film by the alignment limiting force expressed on the surface of the alignment layer. Thereafter, a high-pressure mercury lamp was used to radiate ultraviolet rays onto the resultant at 100 mJ in a nitrogen atmosphere, thereby curing the coating film together with the alignment layer to fix the alignment state of the liquid crystal molecules. In this way, a nematic liquid crystal layer was formed on the alignment layer to manufacture an optical element according to Comparative Example finally.

(Evaluation Results)

About each of the optical elements according to Examples 1 to 4 and Comparative Example, a lattice pattern cutting test was made according to JIS 5400 in order to evaluate the adhesive property thereof. Specifically, a Sellotape (registered trade mark) (CT 24, manufactured by NICHIBAN CO., LTD.) was caused to adhere onto the film with the finger cushion, and subsequently the tape was peeled. The evaluation was made on the basis of the number of squares in which the tape was not peeled out of 100 squares in the lattice pattern. A case in which the liquid crystal layer was not peeled at all was expressed as 100/100. A case in which the liquid crystal layer was completely peeled was expressed as 0/100. The results are shown in Table 1 described below. As is evident form Table 1, the optical elements according to Examples 1 to 4 had good adhesive property but the optical element according to Comparative Example had poor adhesive property.

Next, about each of the optical elements according to Examples 1 to 4 and Comparative Example, the haze value thereof was measured with a haze meter (manufactured by Nippon Denshoku Industries Co., Ltd.) in order to evaluate the alignment property of the liquid crystal layer thereof. A case where the haze value was 0.3% or more was judged to be good, and a case where the haze value was less than 0.3% was judged to be poor. The results are shown in Table 1. As is evident from Table 1, in each of Examples 1 to 4 and Comparative Example, the alignment state of the liquid crystal molecules was even.

TABLE 1

|  |  | Peeling test | Alignment |
|---|---|---|---|
| Examples | 1 | 100/100 | ○ |
|  | 2 | 100/100 | ○ |
|  | 3 | 100/100 | ○ |
|  | 4 | 100/100 | ○ |
| Comparative Example | 1 | 0/100 | ○ |

What is claimed is:

1. An optical element, comprising:
   a transparent base material;
   an alignment property providing layer laminated on the transparent base material; and
   a refractive index anisotropic layer laminated on the alignment property providing layer and having an alignment property provided by an alignment limiting force of the alignment property providing layer,
   wherein the alignment property providing layer is made of an alignment layer comprising an alignment layer composition capable of expressing the alignment limiting force, the alignment layer composition comprises a polymer and a monomer or an oligomer having one or more functional groups,
   the refractive index anisotropic layer is made of a liquid crystal layer formed by curing a liquid crystal composition comprising a polymerizable liquid crystal material,
   in the alignment property providing layer and the refractive index anisotropic layer, the monomer or the oligomer in the alignment property providing layer and the polymerizable liquid crystal material in the refractive index anisotropic layer are crosslinked with each other near an interface between the layers, and
   the monomer or the oligomer is the polymerizable liquid crystal material.

2. The optical element according to claim 1, wherein the alignment property providing layer is the alignment layer comprising the alignment layer composition capable of expressing the alignment limiting force by a photo alignment method.

3. The optical element according to claim 2, wherein the polymer comprised in the alignment layer composition for forming the alignment property providing layer is a polymer having at least one of a cinnamate and a coumalin.

4. The optical element according to claim 1, wherein the polymerizable liquid crystal material in the alignment property providing layer and the polymerizable liquid crystal material in the refractive index anisotropic layer are of a same kind.

5. The optical element according to claim 1, wherein a weight of the monomer or the oligomer comprised in the alignment layer composition for forming the alignment property providing layer is from 0.01 to 3 times that of the polymer.

6. The optical element according to claim 1, wherein a weight of the monomer or the oligomer comprised in the alignment layer composition for forming the alignment property providing layer is from 0.05 to 1.5 times that of the polymer.

* * * * *